United States Patent
Sugimoto et al.

(10) Patent No.: US 9,458,909 B2
(45) Date of Patent: Oct. 4, 2016

(54) DRIVE POWER TRANSMISSION DEVICE

(71) Applicant: Nissan Motor Co., Ltd., Yokohama-shi, Kanagawa (JP)

(72) Inventors: Takuhiro Sugimoto, Isehara (JP); Shigeru Ishii, Atsugi (JP); Kazuhiro Miyachi, Yamato (JP); Takashi Kuwahara, Chigasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/764,995

(22) PCT Filed: Dec. 25, 2013

(86) PCT No.: PCT/JP2013/084578
§ 371 (c)(1),
(2) Date: Jul. 31, 2015

(87) PCT Pub. No.: WO2014/141562
PCT Pub. Date: Sep. 18, 2014

(65) Prior Publication Data
US 2015/0369340 A1 Dec. 24, 2015

(30) Foreign Application Priority Data
Mar. 11, 2013 (JP) ................................. 2013-047596

(51) Int. Cl.
*F16H 3/48* (2006.01)
*F16H 37/02* (2006.01)
*F16H 57/04* (2010.01)
*F16H 61/12* (2010.01)
*F16D 13/74* (2006.01)
*F16D 13/52* (2006.01)
(Continued)

(52) U.S. Cl.
CPC ................ *F16H 3/48* (2013.01); *F16D 13/52* (2013.01); *F16D 13/74* (2013.01); *F16H 37/021* (2013.01);
(Continued)

(58) Field of Classification Search
CPC .... F16D 13/52; F16D 13/74; F16D 25/0638; F16D 25/123; F16H 3/48; F16H 37/021; F16H 57/043; F16H 57/0473; F16H 57/0484; F16H 61/12
See application file for complete search history.

(56) References Cited

U.S. PATENT DOCUMENTS 6,523,657 B1 * 2/2003 Kundermann .......... F16D 21/06
192/107 M
7,114,605 B2 * 10/2006 Grosspietsch ........ F16D 13/583
192/113.36

(Continued)

FOREIGN PATENT DOCUMENTS

DE 10333431 A1 2/2005
DE 102009001286 A 9/2010
(Continued)

*Primary Examiner* — Jacob S Scott
(74) *Attorney, Agent, or Firm* — Global IP Counselors, LLP

(57) ABSTRACT

A drive power transmission device is provided that either disengages a first friction engagement element or a second friction engagement element when the other is engaged. The drive power transmission device detects the temperature of lubricating oil flowing in each friction engagement element using a temperature sensor. The drive power transmission device selectively disengages either a forward clutch or a reverse brake disengages when the other is engaged. The forward clutch and the reverse brake overlap axially, and are layered radially in an inner/outer arrangement. The temperature sensor is positioned at the periphery of the forward clutch and the reverse brake. A lubricating oil pathway is formed such that lubricating oil for cooling the forward clutch and the reverse brake passes through the forward clutch and the reverse brake in the radial direction from the inside of the forward clutch and the reverse brake to the temperature sensor.

15 Claims, 5 Drawing Sheets

(51) Int. Cl.
*F16D 25/0638* (2006.01)
*F16D 25/12* (2006.01)
*F16D 66/00* (2006.01)

(52) U.S. Cl.
CPC ........ F16H 57/043 (2013.01); F16H 57/0473 (2013.01); F16H 57/0484 (2013.01); F16H 61/12 (2013.01); *F16D 25/0638* (2013.01); *F16D 25/123* (2013.01); *F16D 2066/001* (2013.01); *F16D 2300/0214* (2013.01); *F16H 2037/026* (2013.01); *F16H 2061/1276* (2013.01)

(56) References Cited

U.S. PATENT DOCUMENTS

| | | | | |
|---|---|---|---|---|
| 7,966,901 | B2* | 6/2011 | Metzinger | F16D 13/52 192/48.619 |
| 8,790,211 | B2* | 7/2014 | Burgbacher | F16H 3/54 192/48.619 |
| 2005/0107203 | A1* | 5/2005 | Wittkopp | F16D 25/10 475/176 |
| 2007/0170034 | A1* | 7/2007 | Metzinger | F16D 13/72 192/70.12 |

FOREIGN PATENT DOCUMENTS

| | | |
|---|---|---|
| JP | 46-18755 | 6/1971 |
| JP | 2-248748 A | 10/1990 |
| JP | 2001-124110 A | 5/2001 |
| JP | 2003-172439 A | 6/2003 |
| JP | 2007-271018 A | 10/2007 |
| JP | 2007-271019 A | 10/2007 |
| JP | 2010-151312 A | 7/2010 |
| JP | 2011-52746 A | 3/2011 |
| JP | 2011-112115 A | 6/2011 |

* cited by examiner

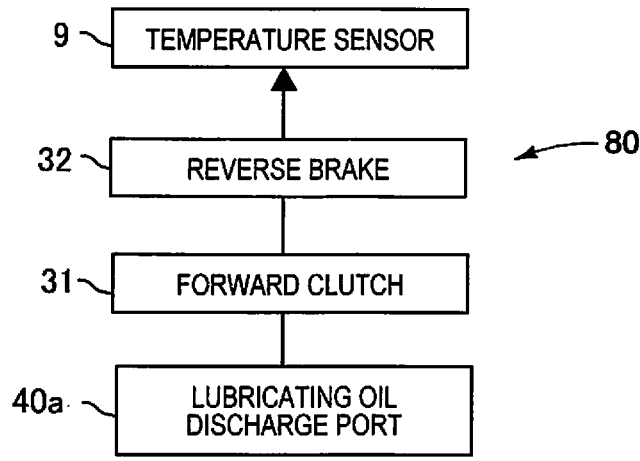
FIG. 4
| | CLUTCH | BRAKE |
|---|---|---|
| SCENE 1 (FORWARD) | ○ | × |
| SCENE 2 (REVERSE) | × | ○ |
| SCENE 3 (NEUTRAL) | × | × |
FIG. 5
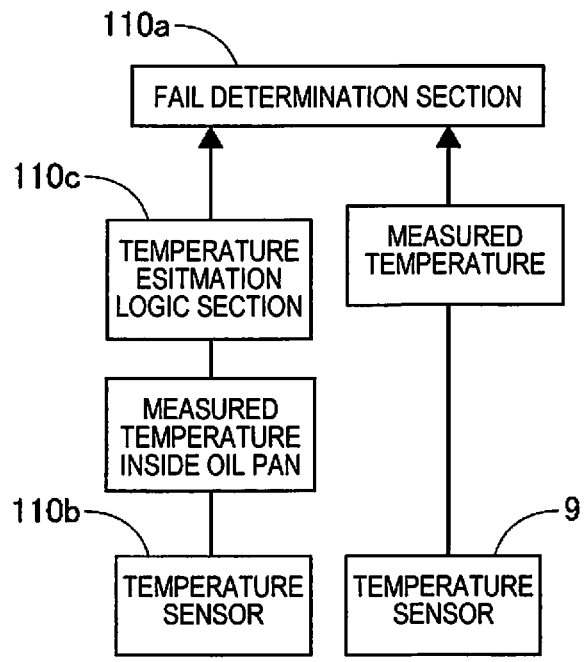
FIG. 6

DRIVE POWER TRANSMISSION DEVICE

CROSS-REFERENCE TO RELATED APPLICATIONS

This application is a U.S. National stage application of International Application No. PCT/JP2013/084578, filed Dec. 25, 2013, which claims priority to Japanese Patent Application No. 2013-047596 filed in Japan on Mar. 11, 2013. The disclosure of Japanese Patent Application No. 2013-047596 is hereby incorporated herein by reference in its entirely.

BACKGROUND

1. Field of the Invention

The present invention relates to a drive power transmission device comprising a plurality of frictional engagement elements, which selectively engage such that when, at least either a first frictional engagement element or a second frictional engagement element is engaged, the other is disengaged.

2. Background Information

Conventionally, a forward/reverse switching device that selectively engages a forward frictional engagement element and a reverse frictional engagement element is known as a drive power transmission device that selectively engages such that, when at least either a first frictional engagement element or a second frictional engagement element is engaged, the other is disengaged (see for example, Japanese Laid-Open Patent Application No. 2010-151312). The forward frictional engagement device is provided with a planetary gear, a forward frictional engagement element for directly connecting an output side ring gear to a sun gear, to which rotation from a drive source is input, and a reverse frictional engagement element for fixing a brake drum that is coupled to a pinion on a case.

SUMMARY

In the conventional forward/reverse switching device described above, individual pathways of lubricating oil exist for cooling each frictional engagement element when engaging each frictional engagement element. Consequently, there is the problem that a temperature sensor must be provided to each lubricating oil pathway when detecting the temperature of each frictional engagement element from the lubricating oil temperature in the lubricating oil pathway; as a result, the manufacturing cost would be increased.

In view of the problem described above, an object of the present invention is to provide a drive power transmission device that selectively engages such that either a first friction engagement element or a second friction engagement element disengages when the other is engaged; the drive power transmission device is capable of reducing the number of lubricating oil pathways that pass through each of the frictional engagement elements and of detecting, by means of a small number of temperature sensors, the temperature of a lubricating oil flowing in each friction engagement element.

In order to achieve the objective described above, the present invention is characterized in that: a first frictional engagement element and a second frictional engagement element overlap axially and are layered radially in an inner/outer arrangement; a temperature sensor is positioned at the periphery of both frictional engagement elements; and a lubricating oil pathway is formed such that a lubricating oil for cooling both frictional engagement elements passes through both frictional engagement elements in the radial direction from the inside of both frictional engagement elements to the temperature sensor.

In the drive power transmission device of the present invention, the lubricating oil flows through the first frictional engagement element and the second frictional engagement element in that order along a lubricating oil pathway when operating the drive power transmission device. Therefore, in a first drive power transmission state in which the first frictional engagement element is engaged and the second frictional engagement element is disengaged, the temperature sensor can detect the temperature of the first frictional engagement element based on the lubricating oil temperature. On the other hand, in a second drive power transmission state in which the second frictional engagement element is engaged and the first frictional engagement element is disengaged, the temperature sensor can detect the temperature of the second frictional engagement element based on the lubricating oil temperature. In this manner, in the present invention, the number of lubricating oil pathways that pass through the two frictional engagement elements was set to be one; as a result, the respective temperatures of both frictional engagement elements can be detected with one temperature sensor, and achieving a reduction in cost is possible by reducing the number of necessary temperature sensors.

BRIEF DESCRIPTION OF THE DRAWINGS

Referring now to the attached drawings which form a part of this original disclosure.

FIG. 4 is a conceptual view of a lubricating oil pathway of the forward/reverse switching device.

FIG. 5 is an operation explanatory view illustrating the operating states of the forward clutch and the reverse brake when the forward/reverse switching device is moving forward, in reverse, and in neutral.

FIG. 6 is an explanatory view of a fail determination in the fail determination section of the drive system and the control system of an FF hybrid vehicle.

DETAILED DESCRIPTION OF THE EMBODIMENTS

Figure 1:
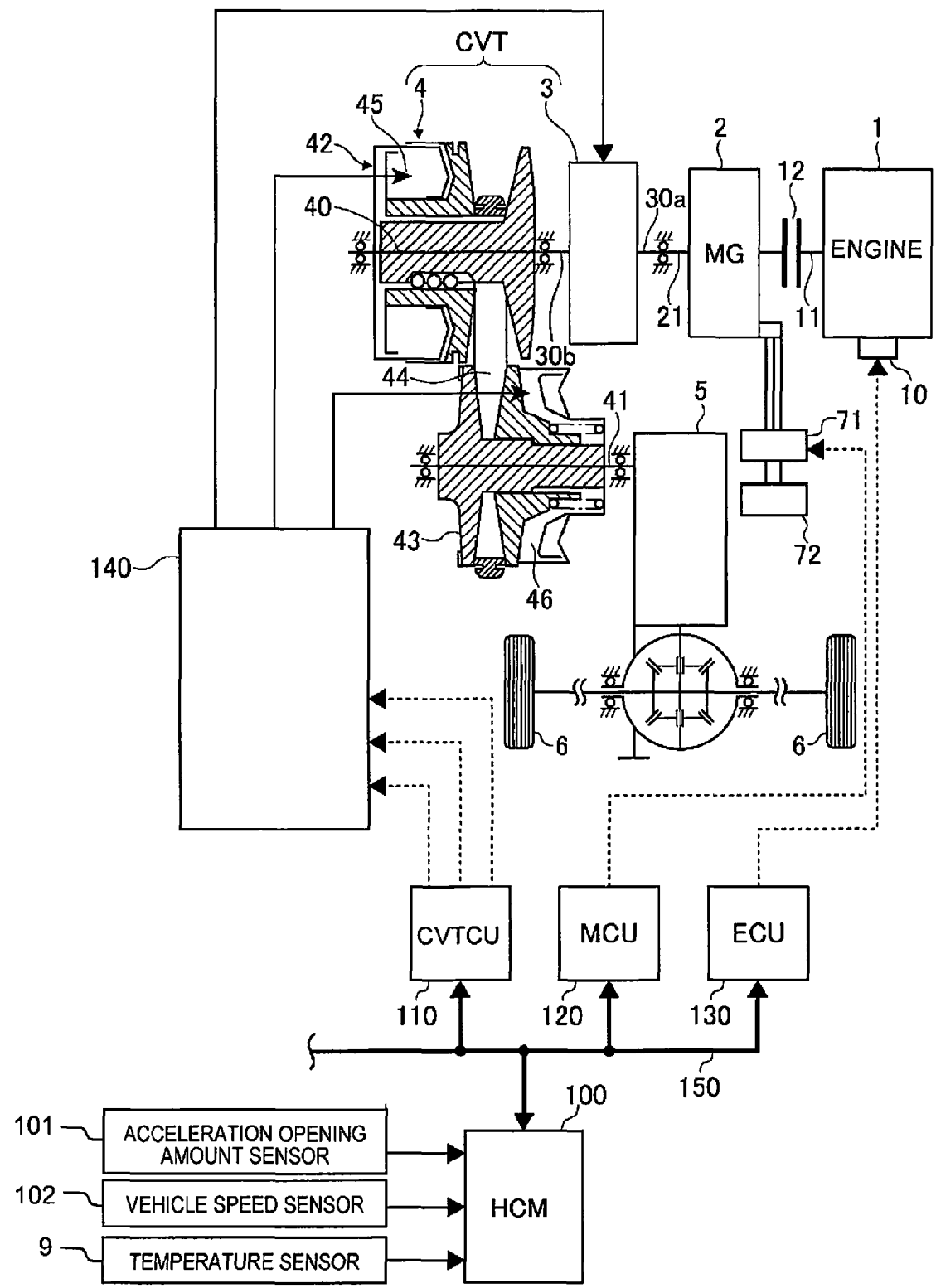
FIG. 1 is an overall system view illustrating the drive system and the control system of an FF hybrid vehicle according to the drive power transmission device of a first embodiment.

Embodiments for realizing the forward/reverse switching device of the present invention are explained below based on the embodiment illustrated in the drawings.

First Embodiment

The configuration will be described first. The drive power transmission device of the first embodiment is applied to a forward/reverse switching device of the FF hybrid vehicle illustrated in FIG. 1. The "overall configuration" and the "configuration of the forward/reverse switching device" will be separately described regarding the configuration of this FF hybrid vehicle.

Overall Configuration

FIG. 1 is an overall schematic view illustrating the FF hybrid vehicle of the first embodiment. The overall configuration of the device will be described below based on FIG. 1.

The hybrid drive system configuration comprises an engine 1 (drive source), a motor generator 2 (drive source), a forward/reverse switching device (drive power transmission device) 3, a belt-type continuously variable transmission mechanism 4, a final reduction gear mechanism 5, and driving wheels 6,6, as illustrated in FIG. 1

A first clutch 12, the engagement/disengagement of which is controlled by the selected traveling mode, is interposed between an engine output shaft 11 of the engine 1 and a motor shaft 21 of the motor generator 2.

The motor generator 2 is a three-phase, alternating current, synchronous rotary electric machine; when powered by a positive torque command, the motor function is exerted by converting the electric power that is discharged from the battery 72 into a three-phase AC power supply with an inverter 71. On the other hand, during regeneration by a negative torque command, the generator function is exerted by generating power with the rotational energy input from the driving wheels 6,6 (or the engine 1), converting the three-phase AC power into a single-phase DC power supply with the inverter 71, and charging the battery 72 therewith.

The forward/reverse switching device 3 is a mechanism for switching the input rotational direction to the belt-type continuously variable transmission mechanism 4, between a forward direction when forward traveling and a reverse direction when reverse traveling. While described in detail below, this forward/reverse switching device 3 comprises a double pinion planetary gear 30 illustrated in FIG. 2 (hereinafter referred to as planetary gear 30), a forward clutch (first frictional engagement element) 31, and a reverse brake (second frictional engagement element) 32. The belt-type continuously variable transmission mechanism CVT is configured by the forward/reverse switching device 3 and the belt-type continuously variable transmission mechanism 4.

Returning to FIG. 1, the belt-type continuously variable transmission mechanism 4 comprises a continuously variable transmission function for continuously changing the transmission ratio, which is the ratio of the input rotational speed of the transmission input shaft 40 and the output rotational speed of the transmission output shaft 41; by changing the belt contact diameter. This belt-type continuously variable transmission mechanism 4 is a well-known one comprising a primary pulley 42, a secondary pulley 43, and a belt 44. The primary pulley 42 and the secondary pulley 43 change the transmission ratio by a primary hydraulic pressure, which is led to a primary hydraulic chamber 45, and a secondary hydraulic pressure, which is led to a secondary hydraulic chamber 46, respectively.

The final reduction gear mechanism 5 is a mechanism that decelerates the transmission output rotation from the transmission output shaft 41 of the belt-type continuously variable transmission mechanism 4, imparts a differential function thereto, and transmits this to the left and right driving wheels 6,6.

In addition, the hybrid vehicle comprises an electric vehicle mode (hereinafter referred to as the "EV mode"), a hybrid vehicle mode (hereinafter referred to as the "HEV mode"), and a drive torque control mode (hereinafter referred to as the "WSC mode"), as modes according to the differences in the driving configuration.

The "EV mode" is a mode in which the first clutch 12 is released and in which the motor generator 2 is the only drive source, comprising a motor drive mode (motor powering) and a generator generation mode (generator regeneration). This "EV mode" is selected when, for example, the required driving force is low and a battery SOC is secured.

The "HEV mode" is a mode in which the first clutch 12 is put in an engaged state and in which the engine 1 and the motor generator 2 are configured as the drive source, comprising a motor assist mode (motor powering), an engine generation mode (generator regeneration), and a regenerative deceleration generation mode (generator regeneration). This "HEV mode" is selected when, for example, the required driving force is high or when a battery SOC is lacking.

Since a rotational difference absorption element, such as a torque converter, is not provided to the drive system, the "WSC mode" is a mode in which the second clutch (forward clutch 31 when moving forward, reverse brake 32 when in reverse) is put in a slip-engagement state in order to control the torque transmission capacity of the second clutch. The torque transmission capacity of the second clutch is controlled so that the driving force that is transmitted via the second clutch will be the required driving force that is represented by the accelerator operation amount of the driver. This "WSC mode" is selected when the engine rotational speed is within a region that falls below the idling rotational speed, as when starting when the "HEV mode" has been selected.

A hybrid control module 100, a CVT control unit 110, the motor control unit 120, and an engine control unit 130 are provided as the control system. The hybrid control module 100 and each of the control units 110, 120, 130 are connected via a CAN communication line 150 that allows for the exchange of information between them.

The hybrid control module 100 manages the energy consumption of the entire vehicle and assumes the integrated control function of running the vehicle at maximum efficiency. Information from an acceleration opening amount sensor 101, a vehicle speed sensor 102, and a temperature sensor 9, etc., as well as the necessary information from the CAN communication line is input into this hybrid control module 100.

In addition to performing hydraulic control of the belt-type continuously variable transmission CVT, such as line pressure control, transmission hydraulic control, and forward/reverse switching control, the CVT control unit 110 also engages/disengages the first clutch 12 and switches the forward/reverse switching device 3 via a hydraulic control unit 140.

The motor control unit 120 outputs a target powering command (positive torque command) or a target generation command (negative torque command) to the inverter 71, based on a control command from the hybrid control module 100. The motor control unit also sends the hybrid control module 100 the actual motor drive torque information or the actual generator braking torque information, which is obtained by detecting a current value applied to the motor, etc.

The engine control unit 130 outputs a drive command to an engine control actuator 10, based on a control command from the hybrid control module 100. The engine control unit also sends the hybrid control module 100 the actual engine drive torque information obtained from the rotational speed or the fuel injection amount, etc. of the engine 1.

Forward/Reverse Switching Device

The forward/reverse switching device 3 is described next. The forward/reverse switching device 3 transmits the rotation of the input shaft 30a on the drive source side to the output shaft 30b, which is coupled to the transmission input shaft 40 on the driving wheel side, while switching the rotational direction between forward and reverse.

Figure 2:
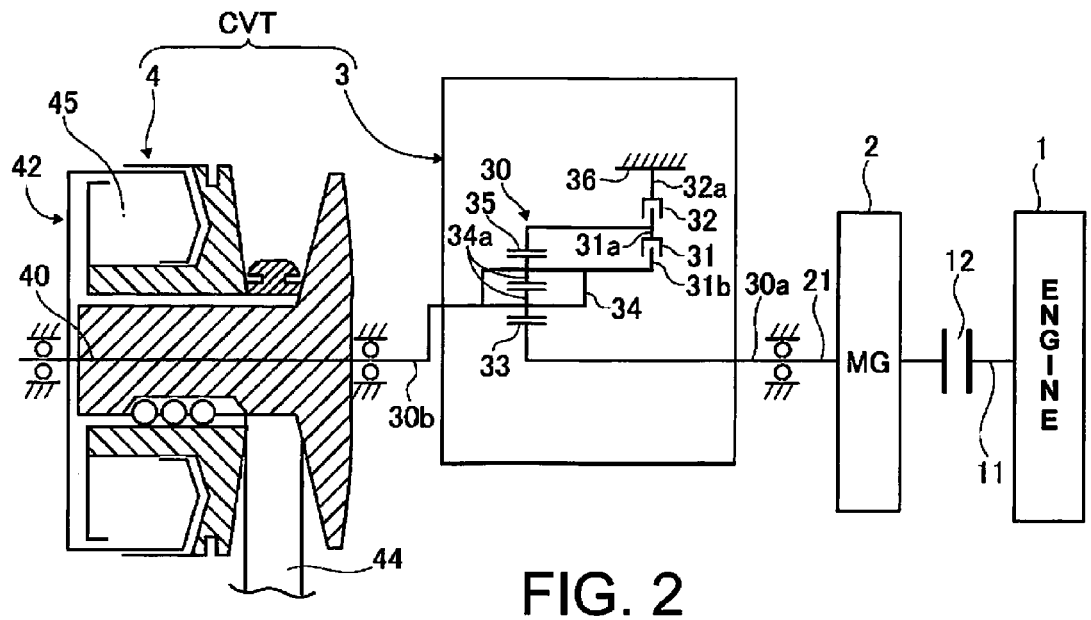
FIG. 2 is a configuration explanatory view illustrating an outline of the forward/reverse switching device as the drive power transmission device of the first embodiment.

The forward/reverse switching device 3 comprises a planetary gear 30 illustrated in FIG. 2 for this switching of the rotational direction. This planetary gear 30 comprises a sun gear 33, a carrier 34, and a ring gear 35, as illustrated in FIG. 2. Additionally, the carrier 34 has a double pinion structure, comprising a plurality of sets of an inner/outer pair of pinions 34a, 34a. Then, the sun gear 33 is connected to the motor shaft 21 via the input shaft 30a. In contrast, the carrier 34 is connected to the transmission input shaft 40 via the output shaft 30b.

The forward clutch 31 joins the carrier 34 and the ring gear 35 while the reverse brake 32 fixes the ring gear 35 to the case 36. While the details have been omitted, the case 36 houses the planetary gear 30 and the belt-type continuously variable transmission mechanism 4.

Figure 3:
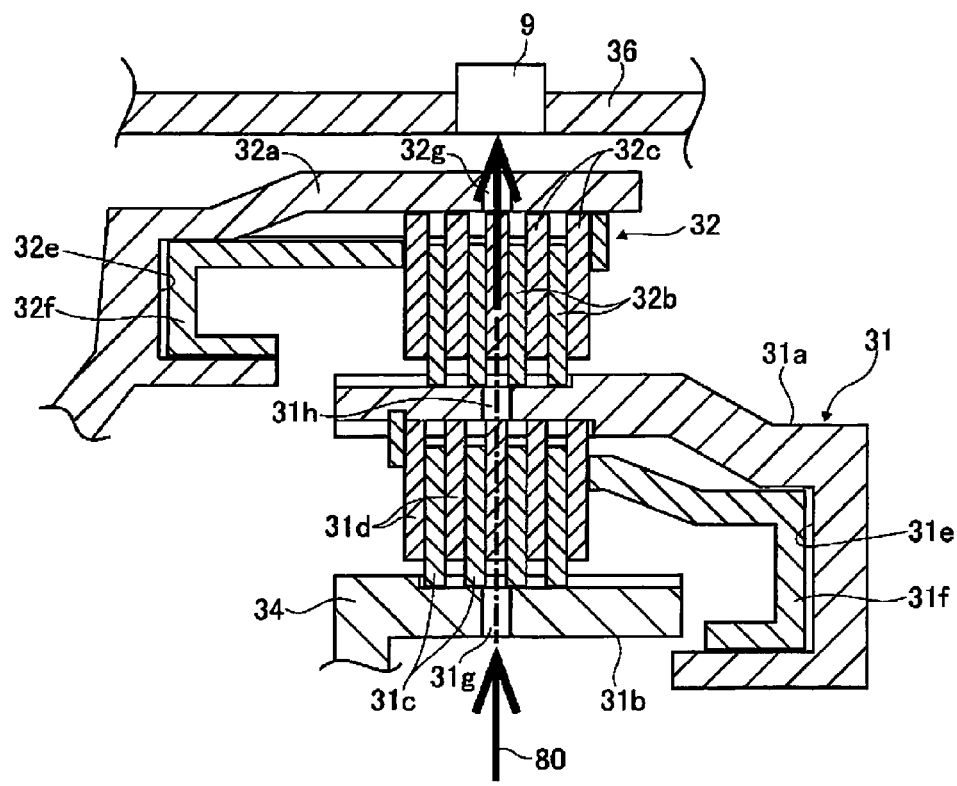
FIG. 3 is a cross-sectional view illustrating the structure of the principle part of the forward/reverse switching device.

The structures of the forward clutch 31 and the reverse brake 32 are described next in more detail, based on FIG. 3. The forward clutch 31 comprises a combined hub/clutch drum 31a, a clutch hub 31b, a drive plate 31c, and a driven plate 31d. The combined hub/clutch drum 31a is integrally formed with the ring gear 35, as illustrated in FIG. 2. Then, a plurality of driven plates 31d are axially provided to the inner periphery of the combined hub/clutch drum 31a, movably in the axial direction (the left-right direction in FIG. 3), as illustrated in FIG. 3.

The clutch hub 31b is positioned radially inward of the combined hub/clutch drum 31a (the downward direction in FIG. 3), and a plurality of drive plates 31c, which are interposed in between the driven plates 31d, are axially provided to the outer periphery thereof, slidably in the axial direction. In addition, the clutch hub 31b is integrally formed with the carrier 34, as illustrated in FIG. 2.

A cylinder chamber 31e is formed in the combined hub/clutch drum 31a, and a clutch piston 31f is housed in this cylinder chamber 31e, slidably in the axial direction. Then, with a hydraulic oil pressure being supplied to the cylinder chamber 31e, the clutch piston 31f presses the drive plate 31c and the driven plate 31d, and the forward clutch 31 is frictionally engaged.

Then, during this frictional engagement of the forward clutch 31, the carrier 34 rotates integrally with the ring gear 35, along with the combined hub/clutch drum 31a, as illustrated in FIG. 2. In this case, the input shaft 30a and the output shaft 30b, that is, the motor shaft 21 and the transmission input shaft 40, rotate forward at 1:1.

The reverse brake 32 comprises a housing 32a, a drive plate 32b, and a driven plate 32c. The housing 32a is fixed to the case 36. A plurality of drive plates 32b is axially provided on the outer periphery of the combined hub/clutch drum 31a, transferably in the axial direction. The driven plates 32c are axially provided to be interposed between the drive plates 32b and are provided on the inner periphery of the housing 32a, movably in the axial direction.

Then, the two plates 32b, 32c are positioned in the outer diameter direction of the two plates 31c, 31d of the forward clutch 31, that is, in substantially the same axial positions as the two plates 31c, 31d.

Also, a cylinder chamber 32e is formed in the housing 32a, and a brake piston 32f is housed in this cylinder chamber 32e, slidably in the axial direction. Then, with a hydraulic oil pressure being supplied to the cylinder chamber 32e, the brake piston 32f presses the two plates 32b, 32c in the axial direction, and the reverse brake 32 is frictionally engaged.

During this frictional engagement of the reverse clutch 32, the ring gear 35 of the planetary gear 30 is fixed to the case 36, along with the combined hub/clutch drum 31a, as illustrated in FIG. 2. In this case, the transmission input shaft 40 rotates in reverse with respect to the rotation of the motor shaft 21.

Returning to FIG. 3, a temperature sensor 9 is provided to the forward/reverse switching device 3. This temperature sensor 9 is for detecting the temperature of the forward clutch 31 and the reverse brake 32, is provided in the outer periphery of the forward clutch 31 and the reverse brake 32, and is further positioned in the outer diameter direction to axially overlap the forward clutch 31 and the reverse brake 32.

Then, a lubricating oil pathway 80 is formed in the forward/reverse switching device 3, such that a lubricating oil for cooling passes through the forward clutch 31 and the reverse brake 32 in tandem in the radial direction, and is led to the temperature sensor 9. Upon forming this lubricating oil pathway 80, a hub oil hole 31g, a drum oil hole 31h, and a housing oil hole 32g are formed penetrating the clutch hub 31b, the combined hub/clutch drum 31a, and the housing 32a, respectively, in the radial direction. That is, the hub oil hole 31g and the drum oil hole 31h are respectively positioned in substantially the same central positions of the axial direction range within which the two plates 31c, 31d of the forward clutch 31 are positioned. Additionally, the housing oil hole 32g is positioned in substantially the same axial position as the hub oil hole 31g and the drum oil hole 31h and the same central position of the axial direction range, in which the two plates 32b, 32c are positioned, so as to be positioned in the outer diameter direction of the hub oil hole 31g and the drum oil hole 31h. Therefore, the lubricating oil pathway 80 that passes through each of the oil holes 31g, 31h, 32g is formed to be substantially a straight line in the radial direction.

This lubricating oil pathway 80 is schematically illustrated in FIG. 4. The lubricating oil pathway 80 is a pathway from a lubricating oil discharge port 40a provided to a lubricating oil path (not shown), which provided through the transmission input shaft 40, to the temperature sensor 9 via the forward clutch 31 and the reverse brake 32, as illustrated in FIG. 4.

As described above, the CVT control unit 110 engages the forward clutch 31 while disengaging the reverse brake 32 during a forward operation in response to the shift operation of the driver, as illustrated in FIG. 5. During a reverse operation, the forward clutch 31 is disengaged while the reverse brake 32 is engaged. Furthermore, during the neutral operation, the forward clutch 31 and the reverse brake 32 are both disengaged.

Additionally, fail determination is performed in the fail determination section 110a, as illustrated in FIG. 6, in the CVT control unit 110. This fail determination is a determination for protecting the friction material of the forward clutch 31 and the reverse brake 32; a fail determination is made when the temperature of the forward clutch 31 and the reverse brake 32 becomes a temperature that exceeds a threshold value set in advance.

That is, as described above, in the WSC mode, the forward clutch 31 or the reverse brake 32 are put in a slip-engaged state. Consequently, if this state continues for a long time, the forward clutch 31 or the reverse brake 32 in the engaged state may develop a high temperature. In this case, the fail determination section 110a performs a fail determination; for example, the CVT control unit 110 executes a failsafe operation, such as releasing the slip-engaged state, and performs a full engagement.

Furthermore, in the fail determination section 110a, a fail determination according to the temperature measurement value of the temperature sensor 9 and a fail determination based on the estimated temperature are executed simultaneously in order to provide redundancy, as illustrated in FIG. 6. This estimated temperature is the temperature of the forward clutch 31 or the reverse brake 32 in the engaged state, which is estimated by a temperature estimation logic section 110c, based on a measured temperature in an oil pan, as measured by a temperature sensor 110b installed in an oil pan, which is not diagrammed.

In order to describe the effects of the first embodiment, first, a comparative example to the embodiment will be described based in FIG. 7 and FIG. 8.

First Comparative Example

Figure 7:
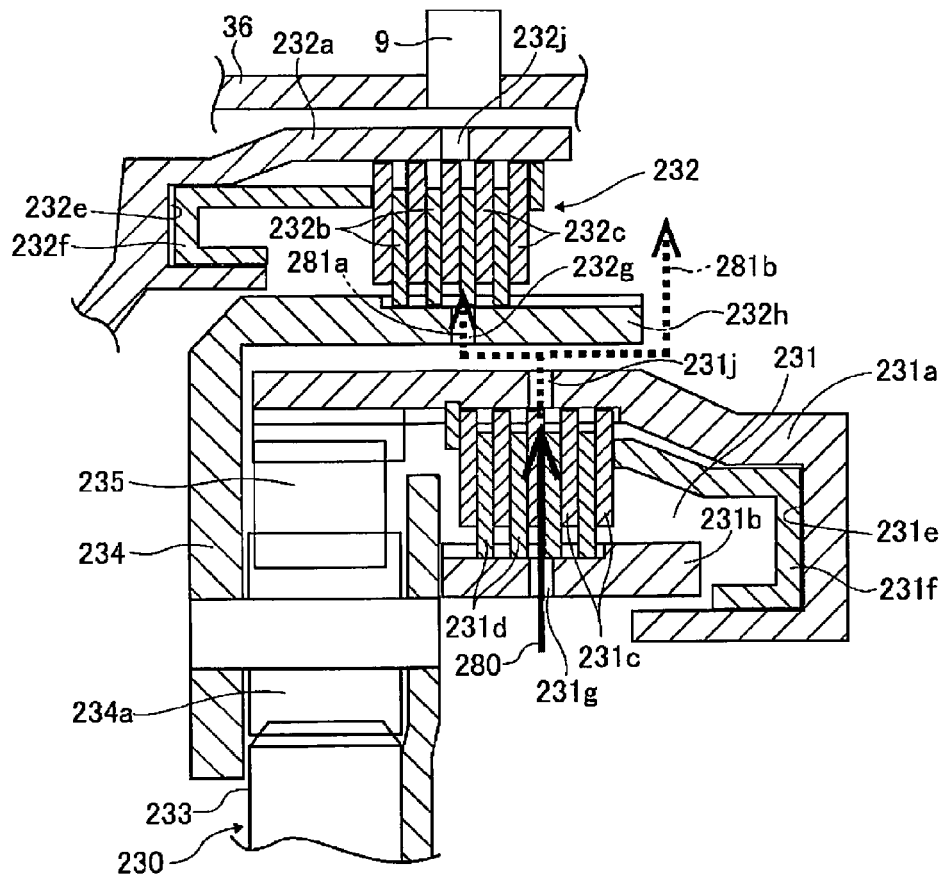
FIG. 7 is a cross-sectional view illustrating a lubricating oil pathway in a drive power transmission device of a first comparative example.
Figure 8:
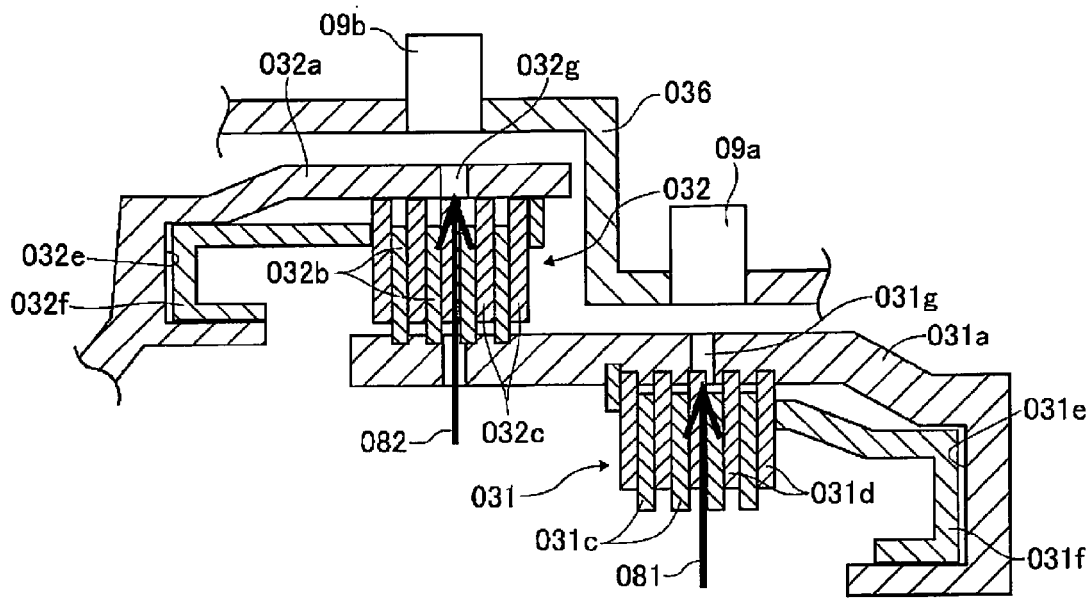
FIG. 8 is a cross-sectional view illustrating a lubricating oil pathway in a drive power transmission device of a second comparative example.

The first comparative example illustrated in FIG. 7 is an example in which a forward clutch 231 and a reverse brake 232 are positioned in the same way as in the conventional structure disclosed in Patent Document 1; also disposed is a temperature sensor 9 on the outer periphery of the reverse brake 232.

In this first comparative example, the planetary gear 230 comprises a sun gear 233, a single pinion 234a, a carrier 234, and a ring gear 235. In addition, the clutch hub 231b that supports the driven plate 231d of the forward clutch 231 is connected to the sun gear 233, and a clutch drum 231a that supports the driven plate 231c is connected to the ring gear 235. Then, the clutch drum 231a is coupled with an input shaft 30a, which is outside of the scope of the drawing, and comprises the same cylinder chamber 231e and clutch piston 231f as those described in the first embodiment.

In the reverse brake 232, a clutch hub 232h that supports the drive plate 232b is connected to the carrier 234. The driven plate 232c is supported by the same housing 232a as that described for the first embodiment. The housing 232a comprises a cylinder chamber 232e and a clutch piston 232f.

In the case of this first comparative example, since the temperature sensor 9 is supported by a case 36, the reverse brake 232 is supported by the same housing 32a as that in the first embodiment. Also, the forward clutch 231 and the reverse brake 232 are disposed to be in different positions that are slightly displaced in the axial direction.

Therefore, in order to form a lubricating oil pathway 280, in the forward clutch 231, a hub oil hole 231g is provided penetrating the clutch hub 231b in the radial direction, and a drum oil hole 231j is provided radially penetrating the clutch drum 231a in the same axial position as the hub oil hole 231g.

Additionally, in the reverse brake 232, a hub oil hole 232g is provided radially penetrating the clutch hub 232h, and a housing oil hole 232j is provided radially penetrating the housing 232a in the same axial position as the hub oil hole 232g.

In this type of first comparative example, the lubricating oil for cooling that is supplied by the lubricating oil pathway 280 heads in the outer diameter direction from the drum oil hole 213j, which radially penetrates the forward clutch 231, then splits to the left and right directions in the drawing at the clutch hub 232h; only a portion thereof is supplied to the reverse brake 232 from the hub oil hole 232g. Consequently, the lubricating efficiency and the cooling efficiency at the reverse brake 232 are insufficient; in addition, there is the risk that a decrease in the detection accuracy is generated when performing temperature detection with the temperature sensor 9.

Second Comparative Example

The comparative example illustrated in FIG. 8 will be described next. In this second comparative example, the driven plate 031d of the forward clutch 031 and the drive plate 032b of the reverse brake 032 are supported by the combined hub/clutch drum 031a in the same way as in the first embodiment.

Additionally, in this second comparative example, unlike in the first embodiment, the axial positions of the forward clutch 031 and the reverse brake 032 are arranged to be different. A cylinder chamber 031e is formed in the combined hub/clutch drum 031a, and a clutch piston 031f for engaging the forward clutch 031 is provided to this cylinder chamber 031e. Also, a cylinder chamber 031e is formed in the housing 032a, and a clutch piston 031f for engaging the reverse brake 032 is provided to this cylinder chamber 031e.

Furthermore, in the combined hub/clutch drum 031a, a drum oil hole 031g, which forms a first lubricating oil pathway 081 for cooling the forward clutch 031, is radially penetrated in the installation position of the forward clutch 031. Then, a first temperature sensor 09a is provided to the case 036 in the radially front position of the drum oil hole 031g. Additionally, in the combined hub/clutch drum 031a, a drum oil hole 032g, which forms a lubricating oil pathway 082 for cooling the reverse brake 032, is radially penetrated in the installation position of the reverse brake 032. Then, a housing oil hole 032g, which forms a second lubricating oil pathway 082, radially penetrates the housing 032a in the installation position of the reverse brake 032 and the outer diameter position of the drum oil hole 032g. A second temperature sensor 09b is then provided to the case 036 in the radially front position of the housing oil hole 032g.

Therefore, in the second comparative example, the lubricating oil for cooling is supplied simultaneously, passing through two pathways of the first lubricating oil pathway 081 and the second lubricating oil pathway 082. Since, in the second comparative example, the first lubricating oil pathway 081 and the second lubricating oil pathway 082 are formed in parallel in this manner, the lubrication efficiency is poor, and the space efficiency is also poor. In addition, the temperature of the forward clutch 031 and the temperature of the reverse brake 032 need to be independently detected, respectively, by the first temperature sensor 09a and the second temperature sensor 09b, which leads to an increase in cost.

The effects of the first embodiment will be described next. When starting by moving forward, the forward clutch 31 is engaged, and the reverse brake 32 is disengaged. At this time, the lubricating oil is circulated through the lubricating oil pathway 80; however, since only the forward clutch 31 is engaged, from among the forward clutch 31 and the reverse brake 32 interposed by this lubricating oil pathway 80, the lubricating oil temperature that is detected by the temperature sensor 9 indicates the temperature of the forward clutch 31.

When starting in reverse, the forward clutch 31 is disengaged while the reverse brake 32 is engaged. At this time, the lubricating oil is circulated through the lubricating oil pathway 80; however, since only the reverse brake 32 is engaged, from among the forward clutch 31 and the reverse brake 32 interposed by this lubricating oil pathway 80, the lubricating oil temperature that is detected by the temperature sensor 9 indicates the temperature of the reverse brake 32.

Effects of the First Embodiment

In the forward/reverse switching device of the first embodiment, the effects listed below can be obtained.

(1) The forward/reverse switching device as the drive power transmission device of the first embodiment comprises a plurality of frictional engagement elements between the input shaft 30a and the output shaft 30b; this device is capable of forming a forward state as the first drive power transmission state, in which the forward clutch 31 as the first frictional engagement element is engaged while the reverse brake 32 as the second frictional engagement element is disengaged, and a reverse state as the second drive power transmission state, in which the forward clutch 31 as the first frictional engagement element is disengaged while the reverse brake 32 as the second frictional engagement element is engaged, wherein the forward clutch 31 and the reverse brake 32 overlap axially and are layered radially in an inner/outer arrangement, a temperature sensor 9 is positioned at the periphery of the forward clutch 31 and the reverse brake 32, and a lubricating oil pathway 80 is formed such that a lubricating oil for cooling the forward clutch 31 and the reverse brake 32 passes through the forward clutch 31 and the reverse brake 32 in the radial direction from the inside of the forward clutch 31 and the reverse brake 32 to the temperature sensor 9. Since the lubricating oil pathway 80 that cools the two frictional engagement elements of the forward clutch 31 and the reverse brake 32 is formed from only one pathway, the lubricating efficiency can be improved when compared to those in which the lubricating pathway branches or are formed plurally, such as in the comparative examples. Additionally, in the first embodiment, detecting the respective temperatures of the forward clutch 31 and the reverse brake 32, which are selectively engaged, with a single temperature sensor 9 becomes possible. A reduction in cost can thereby be achieved, as compared to the second comparative example, which requires a plurality of temperature sensors 9, and the detection accuracy can be improved, as compared to the first comparative example.

(2) The forward/reverse switching device as the drive power transmission device of the first embodiment is characterized in that the temperature sensor 9 is disposed to be in a position that axially overlaps with the forward clutch 31 and the reverse brake 32. Therefore, the temperature can be detected at a high accuracy, as compared to that in which the position of the temperature sensor 9 is arranged in an outer diameter position that does not axially overlap with the forward clutch 31 and the reverse brake 32.

(3) The forward/reverse switching device as the drive power transmission device of the first embodiment comprises a fail determination section 110a that detects the safety regarding the temperature of the forward clutch 31 and the reverse brake 32 as the two frictional engagement elements, wherein the fail determination section 110a executes simultaneously a first determination, based on the detected temperature of the temperature sensor 9, and a second determination, based on the detected temperature of a second temperature sensor, to detect the lubricating oil temperature of an oil pan (diagram omitted), which is in a position different from the lubricating oil pathway. Therefore, even if a problem occurs to one of the two system fail determinations, continuing fail determination is possible; as a result, the fail determination and an improvement in the accuracy of the protection system based thereon can be achieved.

(4) The forward/reverse switching device as the drive power transmission device of the first embodiment comprises a combined hub/clutch drum 31a, which supports a clutch plate (driven plate 31d) of the forward clutch 31 that is positioned inside of both frictional engagement elements on the inner periphery of the combined hub/clutch drum, and which supports a clutch plate (drive plate 32b) of the reverse brake 32 that is positioned outside of both frictional engagement elements, wherein a drum oil hole 31h is provided to form a lubricating oil pathway by being radially penetrated in this combined hub/clutch drum 31a in a position in which the clutch plates (driven plate 31d, drive plate 32b) are provided in the axial direction. Therefore, the portion forming the lubricating oil pathway 80 between the forward clutch 31 and the reverse brake 32 can be set to be one pathway; as a result, the temperature detection accuracy can be improved by preventing the dispersion of the lubricating oil pathway, when compared to that which forms oil holes in two members, as in the first comparative example.

(5) The forward/reverse switching device as the drive power transmission device of the first embodiment is characterized in that an input shaft 30a is connected so as to be capable of receiving the driving force from the motor generator 2 side, which is the drive source of the vehicle, while the output shaft is connected so as to be capable of transmitting the driving force to the transmission input shaft 40, which is on the driving wheel side of the vehicle, and comprises a planetary gear 30 between the input shaft 30a and the output shaft 30b, and the forward clutch 31 and the reverse brake 32 are provided as a forward/reverse switching device 3, which sets the rotational directions of the input shaft 30a and the output shaft 30b to be in the same direction when moving forward, which is the first drive power transmission state, and sets the rotational directions of the input shaft 30a and the output shaft 30b to be reversed when in reverse, which is the second drive power transmission state.

The effects (1)-(4) described above can be achieved in the forward/reverse switching device 3, which selectively engages and disengages the two frictional engagement elements.

Additionally, in a configuration that does not comprise fluid coupling in the drive power transmission system, the first embodiment was configured to slip the forward clutch 31 or the reverse brake 32 of the forward/reverse switching device 3, which are selectively engaged when moving forward and when moving in reverse, when starting in the WSC mode. Since the forward clutch 31 or the reverse brake 32 generates heat at this time, in order to ensure the durability thereof, the temperature must be detected by the temperature sensor 9 so that they will not overheated.

Therefore, the effects (1)-(4) described above become effective when the temperature sensor 9 detects the temperature of the forward clutch 31 and the reverse brake 32.

(6) The forward/reverse switching device as the drive power transmission device of the first embodiment is characterized in that, the planetary gear 30 comprises a sun gear 33 that is coupled to the input shaft 30a, a ring gear 35 that is coupled to the combined hub/clutch drum 31a, and a carrier 34 that is coupled to the output shaft 30b, the forward clutch 31 as the first frictional engagement element is provided to fix the carrier 34 and the ring gear 35 between the combined hub/clutch drum 31a and the carrier 34 during engagement, a reverse brake 32 as the second frictional engagement element is provided to fix the ring gear 35 to the case 36 between the combined hub/clutch drum 31a and a housing 32a that is provided to the outer periphery thereof and is fixed to the case 36 during engagement, and a housing oil hole 32g is provided to the housing 32a to form the lubricating oil pathway 80 by being radially penetrated in a position that axially overlaps with the drum oil hole 31h. Therefore, when the forward clutch 31 is engaged, the carrier 34 and the ring gear 35 can be fixed in the planetary gear 30, and the rotation can be transmitted at 1:1 from the input shaft 30a to the output shaft 30b. Additionally, when the reverse brake 32 is engaged, the ring gear 35 can be fixed in the planetary gear 30, and the rotation can be transmitted from the input shaft 30a to the output shaft 30b, in a manner that is reversed from that when the forward clutch 31 is engaged.

Second Embodiment

Figure 9:
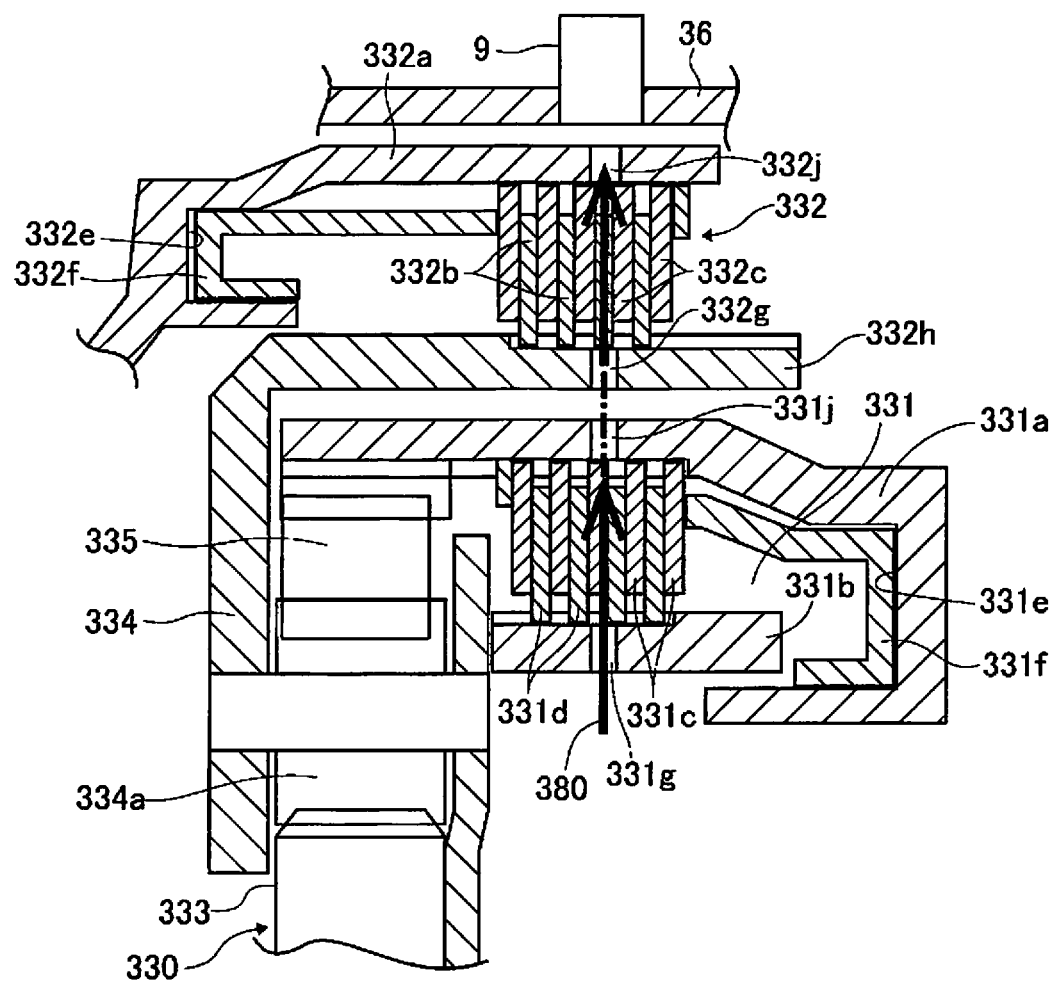
FIG. 9 is a cross-sectional view illustrating the principle part of the drive power transmission device of the second embodiment.

The drive power transmission device of the second embodiment will be described next, based on FIG. 9. This second embodiment is a modified example of the first embodiment, and like the first comparative example, the drive plate 331c and the driven plate 331d of the forward clutch 331 are supported by a clutch drum 331a and a clutch hub 331b. Additionally, the second embodiment is an example in which the drive plate 332b and the driven plate 332c of the reverse brake 332 are supported by a clutch hub 332h and a housing 332a.

The second embodiment is equipped with a planetary gear 330 similar to that in the first comparative example. That is, the planetary gear 330 comprises a sun gear 333, a single pinion 334a, a carrier 334, and a ring gear 335. In addition, the clutch hub 331b that supports the driven plate 331d of the forward clutch 331 is connected to the sun gear 333, and a clutch drum 331a that supports the driven plate 331c is connected to the ring gear 335. Then, the clutch drum 331a is coupled with an input shaft 30a, which is outside of the scope of the drawing, and comprises a cylinder chamber 331e and clutch piston 331f.

In the reverse brake 332, a clutch hub 332h that supports the drive plate 332b is connected to the carrier 334. Additionally, the driven plate 332c is supported by the housing 332a, and the housing 332a comprises a cylinder chamber 332e and a clutch piston 332f.

Then, in the second embodiment, a hub oil hole 331g, which is formed radially penetrating the clutch hub 331b, and a drum oil hole 331j, which radially penetrates the clutch drum 331a, are in the same position axially. In addition, a hub oil hole 332g, which is formed radially penetrating the clutch hub 332h, and a housing oil hole 332j, which radially penetrates the housing 332a, are in the same position axially as the hub oil hole 331g and the drum oil hole 331j. Additionally, the temperature sensor 9 is supported by the case 36, in an outer diameter position of the same position axially as the hub oil hole 331g, the drum oil hole 331j, the hub oil hole 332g, and the housing oil hole 332j.

Therefore, in the second embodiment, a lubricating oil pathway 380, which passes through the forward clutch 331 and the reverse brake 332 in the radial direction to the temperature sensor 9, is formed from the hub oil hole 331g, the drum oil hole 331j, the hub oil hole 332g, and the housing oil hole 332j.

Therefore, the lubricating oil pathway 380 that cools the two frictional engagement elements of the forward clutch 331 and the reverse brake 332 is also formed from only one pathway in the second embodiment, as described above in (1). Accordingly, the lubricating efficiency can be improved, when compared to those in which the lubricating pathway branches or is formed plurally, such as in the comparative examples. In addition, detecting the respective temperatures of the forward clutch 331 and the reverse brake 332, which are selectively engaged, with a single temperature sensor 9 becomes possible; as a result, the cost can be reduced, and a high detection accuracy can be obtained.

Furthermore, in the second embodiment, detecting the temperature at a high accuracy can be achieved since the position of the temperature sensor 9 is positioned on the outer periphery of the forward clutch 331 and the reverse brake 332 and in a position that axially overlaps therewith, as described above in (2).

The forward/reverse switching device of the present invention was described above based on the embodiments, but specific configurations thereof are not limited to these embodiments; various modifications and additions to the design can be made without departing from the scope of the invention according to each claim in the Claims.

In the embodiments, an example was described in which the forward/reverse switching device of the present invention was applied to a hybrid vehicle equipped with an engine and a motor/generator. However, the forward/reverse switching device of the present invention can also be applied to an engine vehicle that is equipped with only an engine as the drive source or to an electric vehicle or a fuel cell vehicle, which is equipped with only a motor/generator as the drive source.

Additionally, a forward/reverse switching device as the drive power transmission device was described in the embodiments; however, the present invention may be applied to another drive power transmission device for a vehicle, such as a transmission, or a drive power transmission device of industrial equipment other than a vehicle, as long as the device comprises a plurality of frictional engagement elements and has a first frictional engagement element and a second frictional engagement element that are in a relationship in which one is disengaged when the other is engaged.

Additionally, in the embodiments, an example was described in which the temperature sensor was positioned on the outer periphery of the two frictional engagement elements (forward clutch, reverse brake), in a position that axially overlaps with the two frictional engagement elements (forward clutch, reverse brake); however, the present invention is not limited thereto. That is, as long as the temperature sensor is positioned on the outer peripheral position of the two frictional engagement elements, even if in axially different position from the two frictional engagement elements, the lubricating oil pathway can be formed from one pathway by changing the orientation from the outside frictional engagement element to the axial direction.

The invention claimed is:

1. A drive power transmission device comprising:
a plurality of frictional engagement elements between an input shaft and an output shaft that are capable of forming a first drive power transmission state, in which a first frictional engagement element is engaged while a second frictional engagement element is disengaged, and a second drive power transmission state, in which the first frictional engagement element is disengaged while the second frictional engagement element is engaged, the first frictional engagement element and the second frictional engagement element overlapping axially, and being layered radially in an inner/outer arrangement,
a temperature sensor positioned at a periphery of the radially outermost frictional engagement element; and
a lubricating oil pathway formed such that a lubricating oil for cooling both of the first and second frictional engagement elements passes through both of the first and second frictional engagement elements in a radial direction from inside of both of the first and second frictional engagement elements to the temperature sensor.

2. The drive power transmission device according to claim 1, wherein
the temperature sensor is disposed in a position that axially overlaps with both of the first and second frictional engagement elements.

3. The drive power transmission device according to claim 1, further comprising
a fail determination section of a continuously variable transmission control unit configured to determine safety regarding temperature of both of the first and second frictional engagement elements,
the fail determination section being configured to simultaneously execute a first determination, based on a detected temperature of the temperature sensor, and a second determination, based on a detected temperature of a second temperature sensor, to detect a lubricating oil temperature at a position different from the lubricating oil pathway.

4. The drive power transmission device according to claim 1, further comprising
a combined hub/clutch drum supporting a clutch plate that is positioned on an inner periphery of the combined hub/clutch drum, while supporting a clutch plate that is positioned on an outer periphery of the combined hub/clutch drum, and
a drum oil hole provided to form the lubricating oil pathway by being radially penetrated in the combined hub/clutch drum in a position in which the clutch plates are provided in an axial direction.

5. The drive power transmission device according to claim 1, wherein
the input shaft is connected so as to be capable of receiving a driving force from a motor source side of a vehicle, while the output shaft is connected so as to be capable of transmitting the driving force to a driving wheel side of the vehicle, and a planetary gear is provided between the input shaft and the output shaft, and
the first frictional engagement element and the second frictional engagement element are provided as a forward/reverse switching device to set rotational directions of the input shaft and the output shaft to be in the same direction while in a first drive power transmission state and to reverse the rotational directions of the input shaft and the output shaft while in a second drive power transmission state.

6. The drive power transmission device according to claim 5, wherein
the planetary gear comprises a sun gear that is coupled to the input shaft, a ring gear that is coupled to the combined hub/clutch drum, and a carrier that is coupled with the output shaft,
the first frictional engagement element fixes the carrier to the ring gear between the combined hub/clutch drum and the carrier during engagement,
the second frictional engagement element fixes the ring gear to a case between the combined hub/clutch drum and a housing that is provided to an outer periphery of the second frictional engagement element and that is fixed to the case during engagement, and
the housing has a housing oil hole, which forms the lubricating oil pathway by being radially penetrated in a position that axially overlaps with the drum oil hole.

7. The drive power transmission device according to claim 2, further comprising
a fail determination section of a continuously variable transmission control unit configured to determine safety regarding temperature of both of the first and second frictional engagement elements,
the fail determination section being configured to simultaneously execute a first determination, based on a detected temperature of the temperature sensor, and a second determination, based on a detected temperature of a second temperature sensor, to detect a lubricating oil temperature at a position different from the lubricating oil pathway.

8. The drive power transmission device according to claim 2, further comprising
a combined hub/clutch drum supporting a clutch plate that is positioned on an inner periphery of the combined hub/clutch drum, while supporting a clutch plate that is positioned on an outer periphery of the combined hub/clutch drum, and
a drum oil hole provided to form the lubricating oil pathway by being radially penetrated in the combined hub/clutch drum in a position in which the clutch plates are provided in an axial direction.

9. The drive power transmission device according to claim 2, wherein
the input shaft is connected so as to be capable of receiving a driving force from a motor source side of a vehicle, while the output shaft is connected so as to be capable of transmitting the driving force to a driving wheel side of the vehicle, and a planetary gear is provided between the input shaft and the output shaft, and
the first frictional engagement element and the second frictional engagement element are provided as a forward/reverse switching device to set rotational directions of the input shaft and the output shaft to be in the same direction while in a first drive power transmission state and to reverse the rotational directions of the input shaft and the output shaft while in a second drive power transmission state.

10. The drive power transmission device according to claim 9, wherein
the planetary gear comprises a sun gear that is coupled to the input shaft, a ring gear that is coupled to the combined hub/clutch drum, and a carrier that is coupled with the output shaft, the first frictional engagement element fixes the carrier to the ring gear between the combined hub/clutch drum and the carrier during engagement, the second frictional engagement element fixes the ring gear to a case between the combined hub/clutch drum and a housing that is provided to an outer periphery of the second frictional engagement element and that is fixed to the case during engagement, and the housing has a housing oil hole, which forms the lubricating oil pathway by being radially penetrated in a position that axially overlaps with the drum oil hole.

11. The drive power transmission device according to claim 3, further comprising a combined hub/clutch drum supporting a clutch plate that is positioned on an inner periphery of the combined hub/clutch drum, while supporting a clutch plate that is positioned on an outer periphery of the combined hub/clutch drum, and a drum oil hole provided to form the lubricating oil pathway by being radially penetrated in the combined hub/clutch drum in a position in which the clutch plates are provided in an axial direction.

12. The drive power transmission device according to claim 3, wherein the input shaft is connected so as to be capable of receiving a driving force from a motor source side of a vehicle, while the output shaft is connected so as to be capable of transmitting the driving force to a driving wheel side of the vehicle, and a planetary gear is provided between the input shaft and the output shaft, and the first frictional engagement element and the second frictional engagement element are provided as a forward/reverse switching device to set rotational directions of the input shaft and the output shaft to be in the same direction while in a first drive power transmission state and to reverse the rotational directions of the input shaft and the output shaft while in a second drive power transmission state.

13. The drive power transmission device according to claim 12, wherein the planetary gear comprises a sun gear that is coupled to the input shaft, a ring gear that is coupled to the combined hub/clutch drum, and a carrier that is coupled with the output shaft, the first frictional engagement element fixes the carrier to the ring gear between the combined hub/clutch drum and the carrier during engagement, the second frictional engagement element fixes the ring gear to a case between the combined hub/clutch drum and a housing that is provided to an outer periphery of the second frictional engagement element and that is fixed to the case during engagement, and the housing has a housing oil hole, which forms the lubricating oil pathway by being radially penetrated in a position that axially overlaps with the drum oil hole.

14. The drive power transmission device according to claim 4, wherein the input shaft is connected so as to be capable of receiving a driving force from a motor source side of a vehicle, while the output shaft is connected so as to be capable of transmitting the driving force to a driving wheel side of the vehicle, and a planetary gear is provided between the input shaft and the output shaft, and the first frictional engagement element and the second frictional engagement element are provided as a forward/reverse switching device to set rotational directions of the input shaft and the output shaft to be in the same direction while in a first drive power transmission state and to reverse the rotational directions of the input shaft and the output shaft while in a second drive power transmission state.

15. The drive power transmission device according to claim 14, wherein the planetary gear comprises a sun gear that is coupled to the input shaft, a ring gear that is coupled to the combined hub/clutch drum, and a carrier that is coupled with the output shaft, the first frictional engagement element fixes the carrier to the ring gear between the combined hub/clutch drum and the carrier during engagement, the second frictional engagement element fixes the ring gear to a case between the combined hub/clutch drum and a housing that is provided to an outer periphery of the second frictional engagement element and that is fixed to the case during engagement, and the housing has a housing oil hole, which forms the lubricating oil pathway by being radially penetrated in a position that axially overlaps with the drum oil hole.

* * * * *